(12) United States Patent
Puehse et al.

(10) Patent No.: US 10,949,902 B2
(45) Date of Patent: Mar. 16, 2021

(54) SYSTEM AND METHOD FOR AUTHENTICATION AND MAKING PAYMENT WHEN CARRYING OUT ON-DEMAND MANUFACTURING

(71) Applicant: MASTERCARD ASIA/PACIFIC PTE LTD, Singapore (SG)

(72) Inventors: Tobias Puehse, Singapore (SG); Bensam Joyson, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 689 days.

(21) Appl. No.: 15/651,213

(22) Filed: Jul. 17, 2017

(65) Prior Publication Data

US 2018/0018725 A1 Jan. 18, 2018

(30) Foreign Application Priority Data

Jul. 18, 2016 (SG) .............................. 10201605884S (51) Int. Cl.
| | |
|---|---|
| *G06Q 30/06* | (2012.01) |
| *G06Q 20/32* | (2012.01) |
| *G06Q 20/36* | (2012.01) |
| *B33Y 30/00* | (2015.01) |
| *B33Y 80/00* | (2015.01) |
| *G06Q 20/20* | (2012.01) |

(52) U.S. Cl.
CPC .......... *G06Q 30/0621* (2013.01); *B33Y 30/00* (2014.12); *B33Y 80/00* (2014.12); *G06Q 20/20* (2013.01); *G06Q 20/3226* (2013.01); *G06Q 20/3278* (2013.01); *G06Q 20/36* (2013.01); *G06Q 20/3227* (2013.01)

(58) Field of Classification Search
CPC .............. G06Q 30/0621; G06Q 20/36; G06Q 20/3278; G06Q 20/3226; G06Q 20/20; G06Q 20/3227; B33Y 80/00; B33Y 30/00
See application file for complete search history.

(56) References Cited

U.S. PATENT DOCUMENTS

| | | | |
|---|---|---|---|
| 2014/0156053 A1* | 6/2014 | Mahdavi ................. | G06Q 50/04 700/119 |
| 2014/0236773 A1* | 8/2014 | Hamilton ............ | G06Q 30/0635 705/26.81 |
| 2014/0279177 A1* | 9/2014 | Stump .................... | B33Y 50/00 705/26.4 |
| 2015/0064299 A1* | 3/2015 | Koreis ................. | G06Q 20/085 707/609 |
| 2015/0205544 A1 | 7/2015 | Webb et al. | |
| 2016/0171354 A1* | 6/2016 | Glasgow ............ | G06Q 30/0207 358/1.14 |

FOREIGN PATENT DOCUMENTS

| | | |
|---|---|---|
| WO | WO2014/126834 | 8/2014 |
| WO | WO2014/126837 | 8/2014 |

* cited by examiner

*Primary Examiner* — Zeshan Qayyum
*Assistant Examiner* — Benjamin J Aitken
(74) *Attorney, Agent, or Firm* — Harness, Dickey & Pierce, P.L.C.

(57) ABSTRACT

There is provided a system and method for authentication and making payment when carrying out on-demand manufacturing. The system and method ensures that payment can be conveniently made by users and subsequently, appropriate payments are made to parties for their role in the on-demand manufacturing.

11 Claims, 5 Drawing Sheets

SYSTEM AND METHOD FOR AUTHENTICATION AND MAKING PAYMENT WHEN CARRYING OUT ON-DEMAND MANUFACTURING

CROSS-REFERENCE TO RELATED APPLICATION

This application claims the benefit of and priority to Singapore Patent Application No. 10201605884S, filed Jul. 18, 2016. The entire disclosure of the above application is incorporated herein by reference.

FIELD

Embodiments of the present disclosure relate to a system and method for authentication and making payment when carrying out on-demand manufacturing.

BACKGROUND

This section provides background information related to the present disclosure which is not necessarily prior art.

The prevalence of data networks has led to a change in how modern businesses operate. The data networks enable connectivity between machines, work pieces and systems, thus creating networks along an entire business value chain that can interface with each other.

On-demand manufacturing, such as, for example, additive manufacturing (commonly known as 3D printing), is becoming increasingly popular as a manufacturing process for goods. Additive manufacturing, such as additive layer manufacturing, facilitates decentralised manufacturing with a possibility to customise goods within a particular batch of goods. It is even possible for "home" manufacturing to take place as consumer-level additive layer printers become more prevalent. This leads to convenience for end users, savings in time and shipping charges since the additive layer manufacturing can be carried out at a geographically nearer location to the end user.

However, there are currently major issues with regard to enhancing convenience of providing access to on-demand manufacturing services. For example, there are limitations with regard to preventing the counterfeiting of proprietary goods, dilution of a value of a branded product due to ease of replication of the branded product, and so forth.

This is undesirable.

SUMMARY

This section provides a general summary of the disclosure, and is not a comprehensive disclosure of its full scope or all of its features. Aspects and embodiments of the disclosure are set out in the accompanying claims.

In a first aspect, there is provided a system for authentication and making payment when carrying out on-demand manufacturing. The system comprises a central repository configured for storing data used for the on-demand manufacturing and for receiving/transmitting instructions for carrying out the on-demand manufacturing; a payment system communicatively coupled to the central repository; and at least one manufacturing apparatus of an on-demand manufacturer, the at least one manufacturing apparatus being communicatively coupled to the central repository. It is advantageous that payment is carried out by the payment system upon the central repository positively authenticating the at least one manufacturing apparatus of on-demand manufacturer.

The system can further comprise at least one user device configured to transmit the instructions to the central repository. The at least one user device can be selected from, for example, a personal computer, a laptop computer, a mobile phone, a tablet computer, and the like.

The data may include, for example, operational parameters of manufacturing apparatus of the on-demand manufacturer; and certification of the manufacturing apparatus of the on-demand manufacturer.

Authentication of at least one manufacturing apparatus of the on-demand manufacturer may include processing the data, and the central repository may be configured for processing the data.

The at least one manufacturing apparatus of the on-demand manufacturer may be at least one additive layer printer. The on-demand manufacturing can include use of network connected manufacturing apparatus.

The payment may be made to an originator of the operational parameters. The payment system can include, for example, a POS device, a digital wallet, a payment gateway, and so forth.

In a second aspect, there is provided a non-transitory computer readable storage medium embodying thereon a program of computer readable instructions which, when executed by one or more processors of a first server in communication with at least one user device, cause the first server to perform a method for authentication and making payment when carrying out on-demand manufacturing. The method is embodied in the steps: receiving, from the at least one user device, first instructions for carrying out the on-demand manufacturing; authenticating a manufacturing apparatus of an on-demand manufacturer; upon the manufacturing apparatus being positively authenticated, retrieving production parameters for carrying out the on-demand manufacturing at the on-demand manufacturer; transmitting, to the manufacturing apparatus of the on-demand manufacturer, the production parameters; and transmitting, to a payment system, second instructions to make payment to an originator of the production parameters.

Authenticating the manufacturing apparatus of the on-demand manufacturer may include: determining whether the on-demand manufacturer is capable of carrying out the production parameters; and determining a certification of an apparatus of the on-demand manufacturer.

The manufacturing apparatus can be at least one additive layer printer or other network connected manufacturing apparatus.

The at least one user device may be selected from, for example, a personal computer, a laptop computer, a mobile phone, a tablet computer, and the like.

In a third aspect, there is provided a platform for authentication and making payment when carrying out on-demand manufacturing, the platform comprising: a communications module configured for transmitting and receiving instructions for carrying out the on-demand manufacturing; a storage module coupled to the communications module configured for storing the received data; an authentication module coupled to the communications module and the storage module, the authentication module being configured for authenticating a manufacturing apparatus of an on-demand manufacturer communicatively coupled to the communications module; and a payment module coupled to the authentication module, the payment module being configured to transmit payment upon positive authentication of the on-demand manufacturer and completion of the on-demand manufacturing.

The manufacturing apparatus of the on-demand manufacturer can be at least one additive layer printer or other network connected manufacturing apparatus.

The data may include: operational parameters usable by the manufacturing apparatus of the on-demand manufacturer, and certification of the manufacturing apparatus of the on-demand manufacturer.

The payment may be transmitted to an originator of the operational parameters.

The communications module may be configured to receive data from at least one user device.

The at least one user device may be selected from, for example, a personal computer, a laptop computer, a mobile phone, a tablet computer, and so forth.

In a fourth aspect, there is provided a data processor implemented method for authentication and making payment when carrying out on-demand manufacturing, the method comprising: receiving, from at least one user device, first instructions for carrying out the on-demand manufacturing; authenticating a manufacturing apparatus of an on-demand manufacturer; upon the manufacturing apparatus of the on-demand manufacturer being positively authenticated, retrieving production parameters for carrying out the on-demand manufacturing at the on-demand manufacturer; transmitting, to the manufacturing apparatus of the on-demand manufacturer, the production parameters; and transmitting, to a payment system, second instructions to make payment to an originator of the production parameters.

Authenticating the on-demand manufacturer may include: determining whether the manufacturing apparatus of the on-demand manufacturer is capable of carrying out the production parameters; and determining a certification of the manufacturing apparatus of the on-demand manufacturer.

The at least one user device is selected from, for example, a personal computer, a laptop computer, a mobile phone, a tablet computer, and so forth.

The on-demand manufacturing may include use of network connected manufacturing apparatus.

Further areas of applicability will become apparent from the description provided herein. The description and specific examples and embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. With that said, in order that the present disclosure may be fully understood and readily put into practical effect, there shall now be described by way of non-limitative example only, certain embodiments of the present disclosure, the description being with reference to the accompanying illustrative figures, in which.

Corresponding reference numerals indicate corresponding parts throughout the several views of the drawings.

DETAILED DESCRIPTION

Embodiments of the present disclosure will be described, by way of example only, with reference to the drawings. The description and specific examples included herein are intended for purposes of illustration only and are not intended to limit the scope of the present disclosure.

There is provided a method, platform and system for authentication and making payment when carrying out on-demand manufacturing using network connected manufacturing apparatus. In at least some embodiments, the method, platform and system allow end-users to request on-demand manufacturing while ensuring that the on-demand manufacturer is able to meet end product expectations and that the on-demand manufacturer and originator(s) of the requested product are also able to be compensated. Thus, the method, platform and system are able to ensure that the end-users do not obtain inferior products, and that the on-demand manufacturer and the originator(s) are able to be appropriately compensated.

Figure 1:
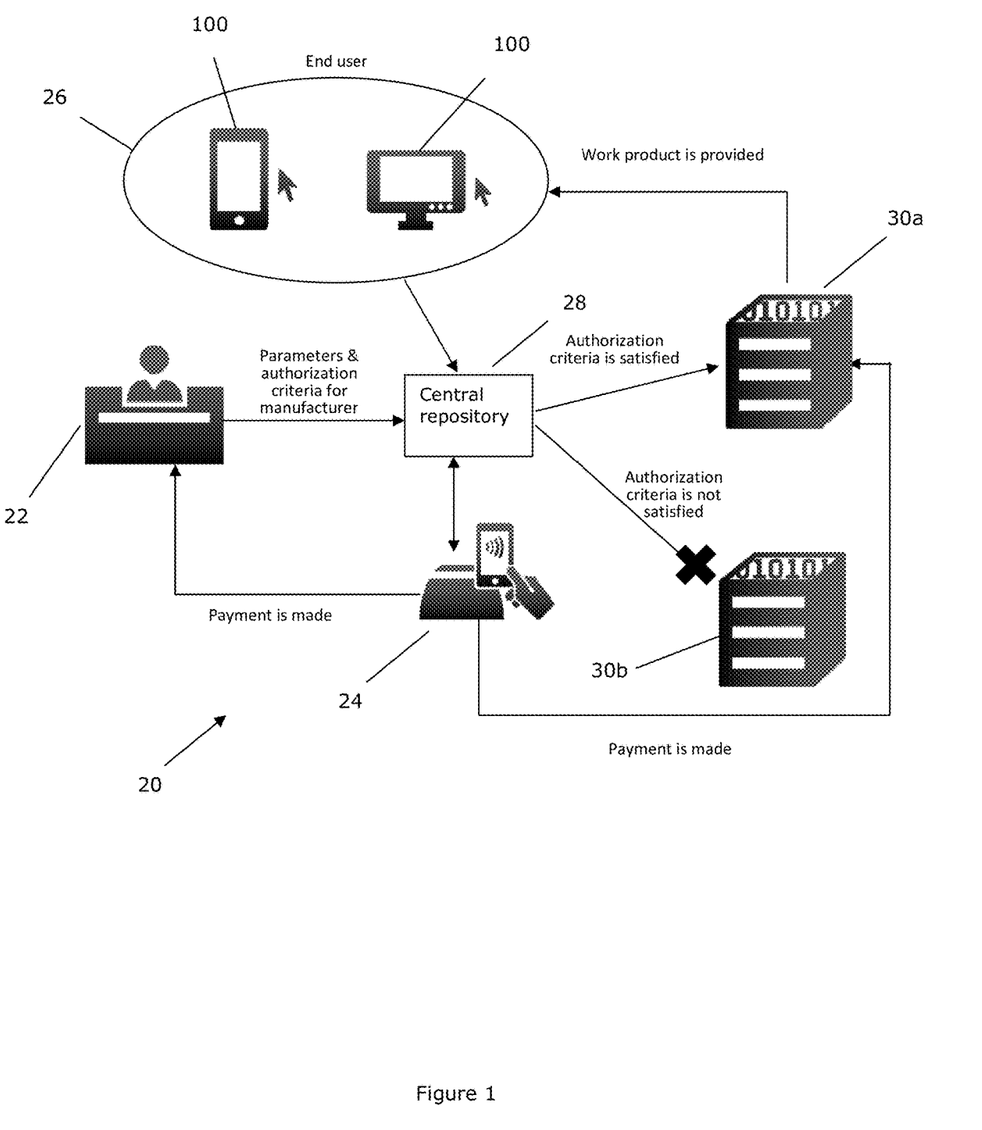
FIG. 1 shows an overview of a system according to certain embodiments of the present disclosure.
Figure 2:
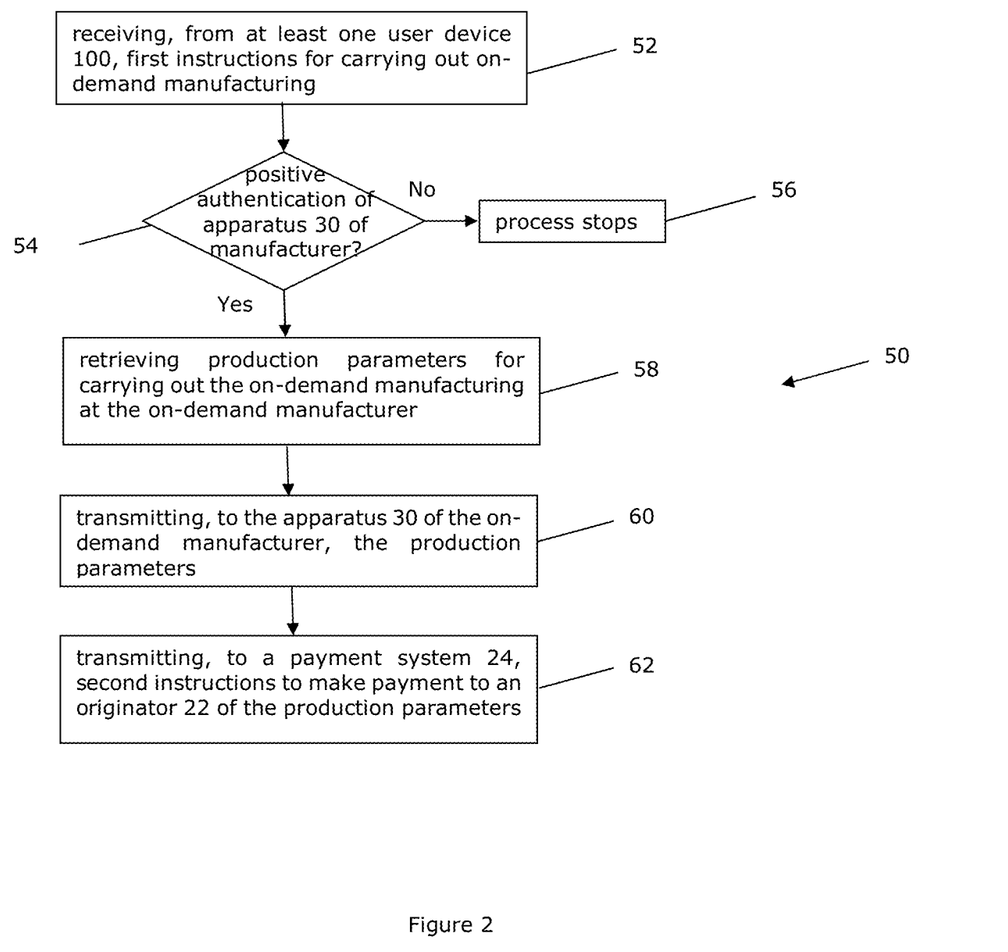
FIG. 2 shows a process flow of a data processor implemented method according to certain embodiments of the present disclosure.

FIG. 2 shows the steps of an exemplary method 50, while FIG. 1 shows a system 20 in which the method 50 is carried out. Each of the blocks of the flow diagram of FIG. 2 may be executed by a data processor(s) or a portion of the data processor (for example, a single core of a multi-core processor). The steps may be embodied in a non-transient machine-readable and/or computer-readable medium for configuring a computer system to execute the method 50. A software module(s) may be stored within and/or transmitted to a computer system memory to configure the computer system to carry out the tasks indicated in each of the blocks of the flow diagram.

Figure 3:
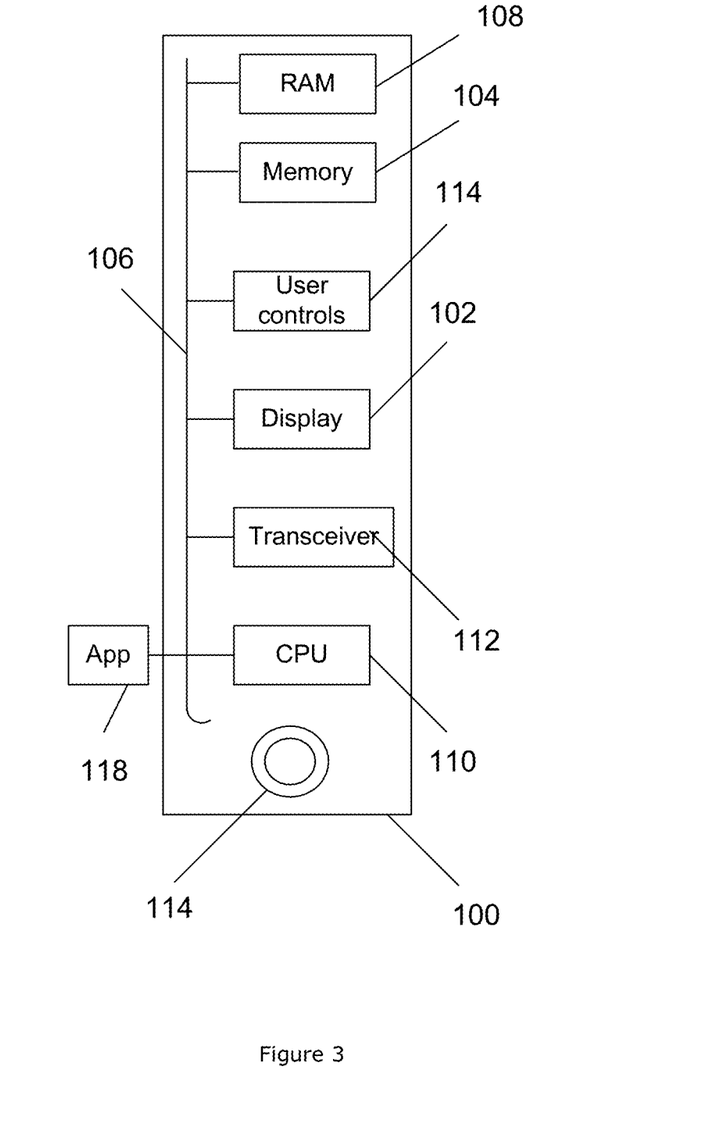
FIG. 3 shows a schematic view of a user device used in the system of FIG. 1 and the method shown in FIG. 2.

In certain embodiments, one or more steps of the method 50 may be at least partly carried out using a mobile device, such as the mobile device 100 shown in FIG. 3. The mobile device 100 can be a handheld device such as a smartphone or a tablet computer, such as one manufactured by Apple™, LG™, HTC™, Samsung™, and Motorola™. An exemplary embodiment of the mobile device 100 is shown in FIG. 3. FIG. 1 also shows the mobile device 100 used by end users 26. As shown, the device 100 includes the following components in electronic communication via a bus 106:
a display 102;
non-volatile memory 104;
random access memory ("RAM") 108;
N processing components 110;
a transceiver component 112 that includes N transceivers; and
user controls 114.

Although the components depicted in FIG. 3 represent physical components, FIG. 3 is not intended to be a hardware diagram; thus many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 102 generally operates to provide a presentation of content to a user, and may be realized by any of a variety of displays (e.g., CRT, LCD, HDMI, micro-projector and OLED displays). And in general, the non-volatile memory 104 functions to store (e.g. persistently store) data (for example, App 118) and executable code including code that is associated with the functional components of the method. In some embodiments, for example, the non-volatile memory 104 includes bootloader code, modem software, operating system code, file system code, and code to facilitate the implementation of one or more portions of the method as well as other components well known to those of ordinary skill in the art that are not depicted for simplicity.

In many implementations, the non-volatile memory 104 is realized by flash memory (e.g., NAND or ONENAND memory), but it is certainly contemplated that other memory types may be utilized as well. Although it may be possible to execute the code from the non-volatile memory 104, the executable code in the non-volatile memory 104 is typically loaded into RAM 108 and executed by one or more of the N processing components 110.

The N processing components 110 in connection with RAM 108 generally operate to execute the instructions stored in non-volatile memory 104 to effectuate the functional components. As one of ordinarily skill in the art will appreciate, the N processing components 110 may include a video processor, modem processor, DSP, graphics processing unit (GPU), and other processing components.

The transceiver component 112 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

Figure 4:
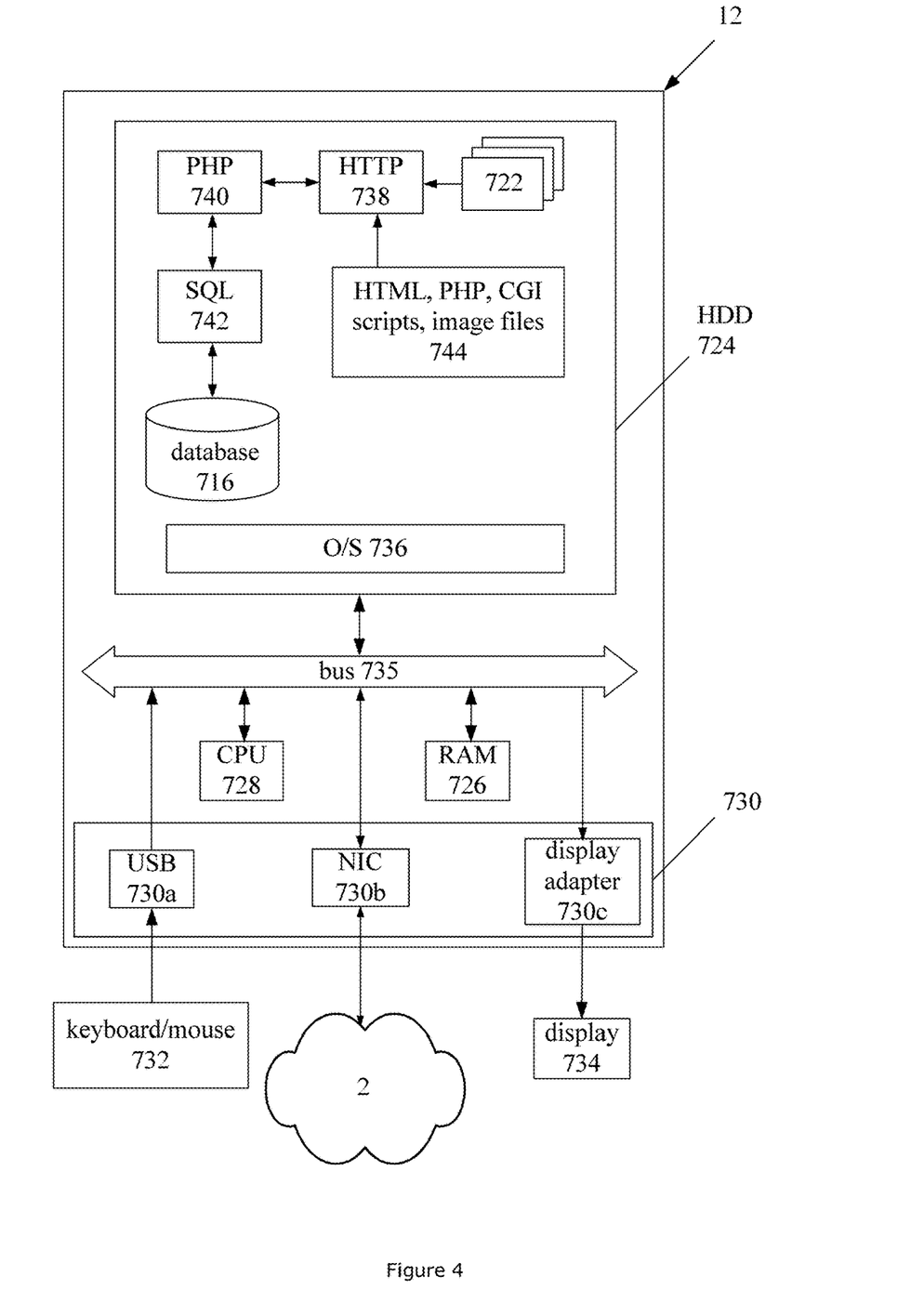
FIG. 4 shows a schematic view of a server used in the system of FIG. 1 and the method shown in FIG. 2.

The method 50 can be carried out by a server 12 as shown in FIG. 4. The server 12 is able to communicate with the mobile device 100 over a communications network 2 using standard communication protocols. The server 12 can be a central repository 28 of the system, and this will be described in greater detail at a later paragraph.

It should be appreciated that the method 50 can be configured to be performed in a variety of ways. The steps can be implemented entirely by software to be executed on computer server hardware, which may comprise one hardware unit or different computer hardware units distributed over various locations, some of which may require the communications network 2 for communication. A number of the components or parts thereof may also be implemented by application specific integrated circuits (ASICs) or field programmable gate arrays.

In FIG. 4, the server 12 is a commercially available server computer system based on a 32 bit or a 64 bit Intel architecture, and the processes and/or methods executed or performed by the computer server 12 are implemented in the form of programming instructions of one or more software components or modules 722 stored on non-volatile (e.g., hard disk) computer-readable storage 724 associated with the server 12. At least parts of the software modules 722 could alternatively be implemented as one or more dedicated hardware components, such as application-specific integrated circuits (ASICs) and/or field programmable gate arrays (FPGAs).

The server 12 includes at least one or more of the following standard, commercially available, computer components, all interconnected by a bus 735:
1. random access memory (RAM) 726;
2. at least one computer processor 728, and
3. external computer interfaces 730:
   a. universal serial bus (USB) interfaces 730a (at least one of which is connected to one or more user-interface devices, such as a keyboard, a pointing device (e.g., a mouse 732 or touchpad),
   b. a network interface connector (NIC) 730b which connects the server 12 to a data communications network, such as the Internet 2; and
   c. a display adapter 730c, which is connected to a display device 734, such as a liquid-crystal display (LCD) panel device.

The server 12 includes a plurality of standard software modules, including:
1. an operating system (OS) 736 (e.g., Linux or Microsoft Windows);
2. web server software 738 (e.g., Apache, available at http://www.apache.org);
3. scripting language modules 740 (e.g., personal home page or PHP, available at http://www.php.net, or Microsoft ASP); and
4. structured query language (SQL) modules 742 (e.g., MySQL, available from http://www.mysql.com), which allow data to be stored in and retrieved/accessed from an SQL database 716.

Together, the web server 738, scripting language 740, and SQL modules 742 provide the server 12 with the general ability to allow users of the Internet 2 with mobile device 100 equipped with standard web browser software to access the server 12 and in particular to provide data to and receive data from the database 716. It will be understood by those skilled in the art that the specific functionality provided by the server 12 to such users is provided by scripts accessible by the web server 738, including the one or more software modules 722 implementing the processes performed by the server 12, and also any other scripts and supporting data 744, including markup language (e.g., HTML, XML) scripts, PHP (or ASP), and/or CGI scripts, image files, style sheets, and the like.

The boundaries between the modules and components in the software modules 722 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the disclosure. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the server 12 may be executed by a module (of software modules 722) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The server 12 normally processes information according to a program (a list of internally stored instructions, such as a particular application program and/or an operating system) and produces resultant output information via input/output (110) devices 730. A computer process typically includes an executing (running) program or portion of a program, current program values and state information, and the resources used by the operating system to manage the execution of the process. A parent process may spawn other child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Referring to FIG. 1, there is shown an example of a system 20 for authentication and making payment when carrying out on-demand manufacturing using network connected manufacturing apparatus. The on-demand manufacturing can be, for example, additive manufacturing, such as stereolithography, digital light processing (DLP), fused deposition modelling (FDM), selective laser sintering (SLS), selective laser melting (SLM), continuous liquid interface production (CLIP, as described in PCT publications WO2014/126837 or WO2014/126834 for example), or electronic beam melting (EBM). FIG. 1 shows constituent components of an exemplary system 20 and also how the respective components interact with one another. It should be appreciated that on-demand manufacturing can occur in a home environment, an office environment or an industrial setting.

The system 20 comprises a central repository 28 which is configured for storing data used for the on-demand manufacturing and for receiving/transmitting instructions for carrying out the on-demand manufacturing. The central repository 28 can be hosted in the server 12 as described earlier. The central repository 28 also processes and stores data provided by an originator 22 of the desired object of the on-demand manufacturing. The originator 22 typically owns intellectual property rights covering the desired object of the on-demand manufacturing, and would be entitled to compensation from third parties who wish to obtain the desired object. The data provided by the originator 22 would typically include, for example, operational parameters of on-demand manufacturing apparatus such that the desired object can be reproduced, whether the on-demand manufacturer has been certified by the originator 22, and so forth. The data is important for determining whether the desired object is able to be manufactured upon demand, that is, upon receiving an order. It should be noted that certification of the on-demand manufacturer can occur, for example, when the on-demand manufacturer uses an apparatus provided by a source which has been approved by the originator 22, when the originator 22 has approved the manufacturing capabilities of the on-demand manufacturer, and so forth.

The central repository 28 can include, for example, a database of originators 22, a database of certified on-demand manufacturers, a database of operational parameters of on-demand manufacturing apparatus, and so forth. The respective databases may reside on different physical servers or on separate logical partitions of a single server. Alternatively, the records relating to originators, on-demand manufacturers, operational parameters, and so on, may be stored in separate tables of a single database (which may be distributed across multiple servers). It should be appreciated that the central repository 28 can include at least one look-up-table which associates entries in the respective databases with one another. Each certified on-demand manufacturer registered in the database(s) of central repository 28 may be associated with multiple on-demand manufacturing apparatus. Each apparatus is associated with an identifier, such as a MAC address or other network identifier such as an IP address, such that individual apparatus connected to the central repository 28 are able to be identified and authorised. On-demand manufacturers may define mappings from these identifiers to other identifiers, such as device names, for ease of reference. These mappings may be provided to the central repository 28 and stored for use during an authentication process.

The system 20 also comprises a payment system 24 communicatively coupled to the central repository 28 and/or to user devices 100 in order to enable users 26 to make payment for on-demand manufacturing services. The payment system 24 can be separate from the central repository 28, or can be hosted on a single server 12. It should be appreciated that other than facilitating payment, the payment system 24 can also be configured to store records of transactions that occur via the payment system 24. It is not necessary for the central repository 28 and the payment system 24 to be administered by a single corporate entity.

In addition, the system 20 can also include at least one manufacturing apparatus 30a, 30b, each of an on-demand manufacturer, the at least one manufacturing apparatus 30a, 30b being communicatively coupled to the central repository 28. It should be appreciated that each manufacturing apparatus 30a, 30b are communicatively coupled to the central repository 28. Each manufacturing apparatus 30a, 30b can be, for example, at least one additive layer printer. Furthermore, the system 20 can include at least one mobile device 100 configured to transmit the instructions from an end user(s) 26 to the central repository 28. While only mobile devices 100 are shown in FIG. 1, it is also possible that the end user(s) 26 use personal computers and laptop computers to transmit the instructions to the central repository 28. It should be noted that the end user(s) 26 can control both their mobile device 100 and the manufacturing apparatus 30. Alternatively, the manufacturing apparatus 30 can be administered by a third party.

In the system 20, the central repository 28 is configured to process the data stored in the respective databases of the central repository 28 and to communicate with the manufacturing apparatus 30a, 30b to authenticate the respective on-demand manufacturers (assuming each manufacturing apparatus 30a, 30b is run by separate on-demand manufacturers). The authentication of the respective on-demand manufacturers is carried out via communications with the manufacturing apparatus 30a, 30b.

For example, a user device 100 may communicate with an on-demand manufacturing apparatus 30a to request manufacture of a design made available by an on-demand manufacturer. User device 100 may receive, from the on-demand manufacturing apparatus 30a, a device identifier, such as the MAC address, IP address or device name, optionally together with other information, such as an identifier, for the requested design and an identifier of the on-demand manufacturer. The device identifier may then be transmitted to the central repository 28 as part of a request to authorise the apparatus 30a to manufacture one or more articles according to the design. Central repository 28, on receiving the device identifier, may then look up the network identifier of the apparatus 30a (if needed) in order to interrogate apparatus 30a, for example, to retrieve operational parameters from a memory of the apparatus 30a. The apparatus 30a may then be authenticated in order to enable the desired articles to be produced, e.g., by checking that the operational parameters meet criteria defined by the originator 22 as described above, and that the apparatus 30a is licensed by originator 22 to manufacture articles according to the design.

In another example, user device 100 communicates with the on-demand apparatus 30a, either directly or through a front-end system (not shown) which is in communication with and manages multiple apparatus 30a, 30b, to request manufacture of a design by apparatus 30a. Apparatus 30a may then initiate a request to the central repository 28 for authentication. The request may comprise an identifier of the requested design, a network identifier of the apparatus 30a (e.g. IP address and/or MAC address), and operational parameters of the apparatus 30a, for example. Central repository 28 may check that the operational parameters meet criteria defined by the originator 22 as described above, and that the apparatus 30a is licensed by originator 22 to manufacture articles according to the design.

The authentication occurs at the manufacturing apparatus 30a, 30b to ensure that the authentication is not over-ridden by any intermediate steps. In some embodiments, each of the manufacturing apparatus 30a, 30b is able to identify itself to the central repository 28 using, for example, a unique ID, a make/model ID, and the like. In FIG. 1, the manufacturing apparatus 30b is not able to be authenticated. This may be because the manufacturing apparatus 30b, for example, is unable to meet operational parameters of on-demand manufacturing apparatus such that the desired object cannot be reproduced, is not certified by the originator 22, and so forth. As a result of a failure of the manufacturing apparatus 30b to be authenticated, no manufacturing is able to take place at the manufacturing apparatus 30b.

Similarly, positive authentication of the manufacturing apparatus 30a of the on-demand manufacturer enables the manufacturing to take place. Positive authentication occurs when the manufacturing apparatus 30a, for example, is able to meet operational parameters of on-demand manufacturing apparatus such that the desired object can be reproduced, is certified by the originator 22, and so forth. Upon positive authentication, payment is carried out by the payment system 24 to the originator 22.

Users 26 may make payment for on-demand manufacturing in a number of ways. For example, if a user device 100 submits a manufacturing request to apparatus 30a and receives confirmation that the manufacturing request has been approved, apparatus 30a (or a front-end system to which it is connected) may push a request to the user device 100 to make a payment. This may be via an HTTP request if the user 26 submitted the request via a web server of the on-demand manufacturer, for example. The web server may serve, to user device 100, a page which prompts the user to enter payment vehicle (such as a credit card or debit card) details, or to sign into a digital wallet service, such as MasterPass® or PayPal®. In other embodiments, apparatus 30a may send a request to user device 100 to invoke a digital wallet application (such as a bank's digital wallet application) executable on the user device 100. The user device 100 may then communicate with a payment gateway (for an e-commerce transaction) or with a digital wallet server in order to complete the payment. Once completed, a payment confirmation is transmitted to the apparatus 30a and/or to a web server or other front-end system of the on-demand manufacturer to initiate the on-demand manufacturing process. As such, the payment system 24 may be or may comprise a payment gateway or a digital wallet server, and the user device 100 may communicate directly with the payment system 24 in order to complete the payment.

In other embodiments, if the user device 100 submits the request to the repository 28 rather than directly to the on-demand manufacturing apparatus 30a, the repository 28 may prompt the user device 100 to complete payment by communicating directly with payment system 24 (much as described above) once it has authenticated the apparatus 30a. Alternatively, repository 28 may receive payment credentials from the user device 100 (for example, a tokenized payment card number) and submit them together with other information (such as a transaction amount corresponding to the cost of manufacturing articles according to the requested design) as part of a transaction authorization request to payment system 24. In one example, the transaction authorization request is submitted to a payment network, such as MasterCard®, which detokenizes the tokenized payment card number and then routes the request to the issuer of the payment card in known fashion.

In yet further embodiments, on-demand manufacturing apparatus 30a or 30b may be in communication with, or have integrated therein, a payment terminal having a magnetic stripe reader and/or a NFC chip reader. Following authentication of the apparatus 30a, as described above, the payment terminal may communicate with the apparatus 30a, or a point-of-sale system with which apparatus 30a is in communication, in order to receive data indicating an amount to be paid for the manufacturing of articles according to the requested design. As such, if a user 26 having a mobile computing device 100 with a digital wallet application (such as ApplePay® or Samsung Pay®) is physically present at the apparatus 30a, and the mobile computing device 100 is equipped with an NFC chip or magnetic secure transmission (MST) chip, the user 26 may make payment in contactless fashion by bringing device 100 into proximity with the payment terminal portion of apparatus 30a.

If the on-demand manufacturer is a third party, a portion of the payment may be due to the third party. For example, the third party may levy a fee of a fixed percentage of the payment to the originator 22, the third party may levy a fee dependent on a scale of a project, the third party may levy a fee depending on an urgency of a project, and so forth. The respective payments made to the originator 22 and the on-demand manufacturer need not be identical. The payments can be carried out using known secure electronic payment methods.

Referring to FIG. 2, there is shown a data processor implemented method 50 for authentication and making payment when carrying out on-demand manufacturing using network connected manufacturing apparatus. The on-demand manufacturing can be, for example, additive layer printing. The method 50 can be carried out in the system 20, specifically in the central repository 28. Numerical references used in FIG. 1 are also used in the following paragraphs for the sake of clarity.

The method 50 comprises receiving, from at least one user device 100, first instructions for carrying out the on-demand manufacturing (52). Typically, the first instructions can be provided using a graphical user interface of the at least one user device 100. The first instructions can include, for example, information on a desired object to be manufactured, a quantity of the desired object to be manufactured, ID of the on-demand manufacturer, and so forth.

The method 50 then includes authenticating a manufacturing apparatus 30 of an on-demand manufacturer (54). Specifically, authenticating the manufacturing apparatus 30 of on-demand manufacturer can include, for example, determining whether the manufacturing apparatus 30 of the on-demand manufacturer is capable of carrying out production parameters to manufacture the desired object; determining if the manufacturing apparatus 30 is certified by the originator 22, and so forth. Authenticating the manufacturing apparatus 30 of the on-demand manufacturer can also be viewed as authentication of the on-demand manufacturer. The authentication of the respective on-demand manufacturers may be carried out substantially as described above.

The authentication occurs at the manufacturing apparatus 30 to ensure that the authentication is not over-ridden by any intermediate steps. It should be noted that certification of the on-demand manufacturer can occur, for example, when the on-demand manufacturer uses an apparatus provided by a source which has been approved by the originator 22, when the originator 22 has approved the manufacturing capabilities of the on-demand manufacturer, and so forth. When the manufacturing apparatus 30 of the on-demand manufacturer is not able to be authenticated, the method 50 ceases (56).

When the manufacturing apparatus 30 of the manufacturer is positively authenticated, production parameters for carrying out the on-demand manufacturing are retrieved (58). The production parameters can include, for example, product specifications, machine language for manufacturing the product, source code for manufacturing the product, and so forth. As an additional measure, the production parameters can be copy-protected/rights-managed such that non-authorised parties are unable to access the production parameters. Subsequently, the method 50 includes transmitting, to at least one manufacturing apparatus 30 of the on-demand manufacturer, the production parameters (60) such that the desired manufacturing can be carried out. The method 50 then includes transmitting, to a payment system 24, second instructions to make payment to an originator 22 of the production parameters (62). If the on-demand manufacturer is a third party, a portion of the payment may be due to the third party. For example, the third party may levy a fee of a fixed percentage of the payment to the originator 22, the third party may levy a fee dependent on a scale of a project, the third party may levy a fee depending on an urgency of a project, and so forth. The respective payments made to the originator 22 and the on-demand manufacturer need not be identical. The payments can be carried out using known secure electronic payment methods.

Figure 5:
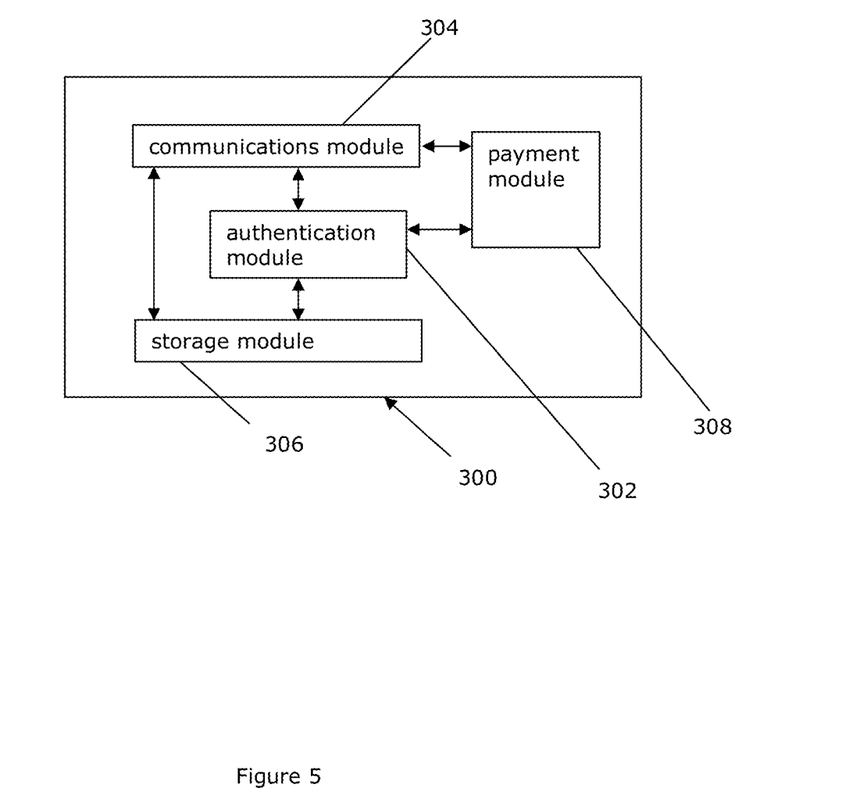
FIG. 5 shows a schematic view of a platform according to certain embodiments of the present disclosure.

Referring to FIG. 5, there is also shown an alternative representation of the system 20 in a form of a platform 300 for authentication and making payment when carrying out on-demand manufacturing using network connected manufacturing apparatus. Modules of the platform 300 can be part of components of the system 20. It should appreciated that the platform 300 can facilitate the carrying out of the method 50 and can be hosted on the server 12, or partially hosted on the server 12. It should also be appreciated that the platform 300 can be supported by the system 20. It can be possible that the central repository 28 can be the platform 300. As the method platform 300 can be supported by the system 20, numerical references used in FIG. 1 are also used in the following paragraphs for the sake of clarity.

The platform 300 comprises a communications module 304 configured for transmitting and receiving instructions for carrying out the on-demand manufacturing. For example, the instructions are transmitted from at least one mobile device 100 using a graphical user interface to running on the at least one mobile device 100. There is also a storage module 306 coupled to the communications module 304, the storage module 306 being configured for storing the received data. The storage module 306 can include, for example, a database of originators 22, a database of certified on-demand manufacturers, a database of operational parameters of on-demand manufacturing apparatus, a database of end users, and so forth.

In addition, the platform 300 can also include an authentication module 302 coupled to the communications module 304 and the storage module 306, the authentication module 302 being configured for authenticating a manufacturing apparatus 30 of an on-demand manufacturer communicatively coupled to the communications module 304. Authenticating the manufacturing apparatus 30 of an on-demand manufacturer can include, for example, determining whether the manufacturing apparatus 30 of the on-demand manufacturer is capable of carrying out production parameters to manufacture the desired object; determining if the manufacturing apparatus 30 of the on-demand manufacturer is certified by the originator 22, and so forth. The authentication of the respective on-demand manufacturers may be carried out substantially as described above. Authenticating the manufacturing apparatus 30 of the on-demand manufacturer can also be viewed as authentication of the on-demand manufacturer.

Finally, the platform 300 can also include a payment module 308 coupled to the authentication module 302. The payment module 308 is configured to transmit payment upon positive authentication of the on-demand manufacturer. Payment is transmitted to an originator of the operational parameters. If the on-demand manufacturer is a third party, a portion of the payment may be due to the third party. For example, the third party may levy a fee of a fixed percentage of the payment to the originator 22, the third party may levy a fee dependent on a scale of a project, the third party may levy a fee depending on an urgency of a project, and so forth. The respective payments made to the originator 22 and the on-demand manufacturer need not be identical.

For the sake of illustration, an example denoting use of the system 20, method 50 and platform 300 is provided below. The main characters of the example are:

a) Bob (akin to originator 22), a manufacturer with proprietary designs arising from substantial investment;

b) Susan, a 3D printer manufacturer that Bob has worked closely with to ensure that Susan produces 3D printers which produces work products that are trustworthy and meet his quality standards; and c) Michael (akin to end user 26), an end user who wants one of Bob's proprietary products.

Michael is from the aviation industry and he desires an urgent replacement part for a project. He refers to an online catalogue on a computing device and identifies the desired part.

As Bob's company is located in a different country, it is not feasible for Michael to order and obtain the part. Instead, he uses a 3D printer that he purchased from Susan. By making a selection on his computing device, Michael sends a request to manufacture the desired product on this printer. The printer communicates with the central repository 28 to ensure that printing can take place. Authentication of the 3D printer takes place and manufacturing begins as the printer that Michael bought from Susan is successfully authenticated.

The 3D printer is transmitted production parameters from the central repository 28. Upon successful authentication of the 3D printer, Michael is charged a design fee for the object.

Bob is pleased about this new way of manufacturing as it drives margins with less capital risk. With improved margins and the control of quality of his proprietary designs, Bob is comfortable forfeiting a portion of the design fee for use of the central repository 28. If Michael uses a third party to carry out the manufacturing, a portion of the design fee can also be payable to the third party.

It should be appreciated that the system 20, method 50 and platform 300 leverages the network infrastructure to support IP management, payment settlement, and apparatus authentication. There is quality assurance for both the end user and the originator. All these aspects have revenue opportunity that will grow significantly with the emergence and implementation of the system for on-demand manufacturing systems using network connected manufacturing apparatus.

Whilst there have been described in the foregoing description embodiments of the present disclosure, it will be understood by those skilled in the technology concerned that many variations or modifications in details of design or construction may be made without departing from the present disclosure.

With that said, and as described, it should be appreciated that one or more aspects of the present disclosure transform a general-purpose computing device into a special-purpose computing device when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for authentication and making payment when carrying out on-demand manufacturing, the system comprising:
   at least one manufacturing apparatus of an on-demand manufacturer;
   a central repository communicatively coupled to the at least one manufacturing apparatus, the central repository comprising a first processor and a first memory including first processor executable instructions, that when executed by the first processor, cause the first processor to perform the steps of:
      storing manufacturing data, the manufacturing data including at least a certification of the at least one manufacturing apparatus of the on-demand manufacturer;
      receiving instructions for carrying out the on-demand manufacturing from at least one user device, the instructions including a device identifier associated with the at least one manufacturing apparatus;
      in response to receiving the instructions, retrieving operational parameters from the at least one manufacturing apparatus based on the device identifier;
      authenticating the at least one manufacturing apparatus based on the certification and the operational parameters; and
      in response to authenticating the at least one manufacturing apparatus, transmitting production parameters for the on-demand manufacturing to the at least one manufacturing apparatus; and
   a payment system communicatively coupled to the central repository, the payment system comprising a second processor and a second memory including second processor executable instructions, that when executed by the second processor, cause the second processor to perform the step of:
      transmitting payment in response to the at least one manufacturing apparatus of the on-demand manufacturer being authenticated by the first processor of the central repository.

2. The system of claim 1, further comprising the at least one user device; wherein the at least one user device comprises a third processor and a third memory including third processor executable instructions, that when executed by the third processor, cause the third processor to perform the step of transmitting the instructions for carrying out the on-demand manufacturing to the central repository; and
   wherein the at least one user device is selected from a group consisting of: a personal computer, a laptop computer, a mobile phone and a tablet computer.

3. The system of claim 1, wherein the at least one manufacturing apparatus of the on-demand manufacturer is at least one additive layer printer.

4. The system of claim 1, wherein the second processor executable instructions, when executed by the second processor, cause the second processor to perform the step of transmitting the payment to an originator of the operational parameters.

5. The system of claim 1, wherein the payment system includes at least one of: a POS device, a digital wallet, and a payment gateway.

6. The system of claim 1, wherein the first processor executable instructions, when executed by the first processor, further cause the first processor to perform the step of retrieving the production parameters for the on-demand manufacturing, prior to transmitting the production parameters to the at least one manufacturing apparatus.

7. A method for authenticating and making payment when carrying out on-demand manufacturing, the method comprising:
- storing, by a processor of a central repository server coupled to at least one manufacturing apparatus of an on-demand manufacturer, manufacturing data, the manufacturing data including at least a certification of the at least one manufacturing apparatus of the on-demand manufacturer;
- receiving, by the processor of the central repository server, instructions for carrying out on-demand manufacturing from at least one user device, the instructions including a device identifier associated with the at least one manufacturing apparatus;
- in response to receiving the instructions, retrieving, by the processor of the central repository server, operational parameters from the at least one manufacturing apparatus based on the device identifier;
- authenticating, by the processor of the central repository server, the at least one manufacturing apparatus based on the certification and the operational parameters;
- in response to authenticating the at least one manufacturing apparatus, transmitting, by the processor of the central repository server, production parameters for the on-demand manufacturing to the at least one manufacturing apparatus; and
- transmitting, by a processor of a payment system communicatively coupled to the central repository server, payment in response to the at least one manufacturing apparatus of the on-demand manufacturer being authenticated by the processor of the central repository server.

8. The method of claim 7, further comprising retrieving, by the processor of the central repository server, the production parameters for the on-demand manufacturing, prior to transmitting the production parameters to the at least one manufacturing apparatus.

9. The method of claim 7, wherein transmitting the payment includes transmitting the payment to an originator of the operational parameters.

10. The method of claim 7, wherein the payment system includes at least one of: a POS device, a digital wallet, and a payment gateway.

11. A method for authenticating and making payment when carrying out on-demand manufacturing, the method comprising:
- storing, by a processor of a central repository server coupled to at least one additive layer printer of an on-demand manufacturer, manufacturing data, the manufacturing data including at least a certification of the at least one additive layer printer of the on-demand manufacturer;
- receiving, by the processor of the central repository server, instructions for carrying out on-demand manufacturing from at least one user device, the instructions including a device identifier associated with the at least one additive layer printer;
- in response to receiving the instructions, retrieving, by the processor of the central repository server, operational parameters from the at least one additive layer printer based on the device identifier;
- authenticating, by the processor of the central repository server, the at least one additive layer printer based on the certification and the operational parameters;
- in response to authenticating the at least one additive layer printer, transmitting, by the processor of the central repository server, production parameters for the on-demand manufacturing to the at least one additive layer printer; and
- transmitting, by a processor of a payment system communicatively coupled to the central repository server, payment in response to the at least one additive layer printer of the on-demand manufacturer being authenticated by the processor of the central repository server.

* * * * *